United States Patent
Itay et al.

(10) Patent No.: US 8,313,028 B2
(45) Date of Patent: Nov. 20, 2012

(54) MULTIPLE ANTENNA READING SYSTEM SUITABLE FOR USE WITH CONTACTLESS TRANSACTION DEVICES

(75) Inventors: Nehemya Itay, Bet Hillel (IL); Ronnie Gilboa, Moshav Beit Hillel (IL); Oded Bashan, Rosh Pina (IL)

(73) Assignee: On Track Innovations Ltd., Rosh Pina (IL)

( * ) Notice: Subject to any disclaimer, the term of this patent is extended or adjusted under 35 U.S.C. 154(b) by 0 days.

(21) Appl. No.: 12/707,448

(22) Filed: Feb. 17, 2010

(65) Prior Publication Data

US 2011/0198398 A1    Aug. 18, 2011

(51) Int. Cl.
*G06K 7/00* (2006.01)

(52) U.S. Cl. .......................... 235/440; 235/435; 235/439

(58) Field of Classification Search .................. 235/435, 235/439, 440, 487, 492; 340/10, 572
See application file for complete search history.

(56) References Cited

U.S. PATENT DOCUMENTS

| | | |
|---|---|---|
| 3,395,353 A | 7/1968 | King |
| 4,497,068 A | 1/1985 | Fischer |
| 4,857,760 A | 8/1989 | Stuebing |
| 4,951,044 A | 8/1990 | Nelson et al. |
| 5,241,160 A | 8/1993 | Bashan et al. |
| 5,349,173 A | 9/1994 | Scheckel et al. |
| 5,357,091 A | 10/1994 | Ozawa et al. |
| 5,539,188 A | 7/1996 | Fallah et al. |
| 5,640,003 A | 6/1997 | Makino |
| 5,698,838 A | 12/1997 | Yamaguchi |
| 5,786,763 A * | 7/1998 | Canipe ........................ 340/572.7 |
| 5,801,372 A | 9/1998 | Yamaguchi |
| 5,812,942 A | 9/1998 | Allen et al. |
| 5,815,020 A | 9/1998 | Allen et al. |
| 5,825,329 A | 10/1998 | Veghte et al. |
| 5,831,257 A | 11/1998 | Yamaguchi |
| 5,864,126 A | 1/1999 | Hutton, Jr. |
| 5,874,725 A | 2/1999 | Yamaguchi |
| 5,978,655 A | 11/1999 | Ohura et al. |
| 6,021,951 A | 2/2000 | Nishikawa |
| 6,074,312 A | 6/2000 | Lyon et al. |
| RE36,769 E | 7/2000 | Ozawa et al. |
| 6,161,762 A | 12/2000 | Bashan et al. |
| 6,202,927 B1 | 3/2001 | Bashan et al. |
| 6,209,592 B1 | 4/2001 | Gilboa et al. |
| 6,234,902 B1 | 5/2001 | Hazama |
| 6,329,139 B1 | 12/2001 | Nova et al. |
| 6,375,082 B1 | 4/2002 | Kobayashi et al. |

(Continued)

OTHER PUBLICATIONS

International Search Report of Application No. PCT/IL11/00168 mailed on May 10, 2011.

*Primary Examiner* — Michael G Lee
*Assistant Examiner* — Matthew Mikels
(74) *Attorney, Agent, or Firm* — Pearl Cohen Zedek Latzer, LLP

(57) ABSTRACT

A multiple antenna reading system suitable for use with contactless transaction devices, the system including at least one reader, at least first and second antennas having at least some inductive coupling therebetween and being coupled to the at least one reader and antenna function disabling circuitry automatically operative upon activation of at least a first one of the at least first and second antennas to disable antenna function of at least a second one of the at least first and second antennas.

23 Claims, 10 Drawing Sheets

U.S. PATENT DOCUMENTS

| | | |
|---|---|---|
| 6,445,743 B1 | 9/2002 | Arnold |
| 6,507,130 B1 | 1/2003 | Thuringer et al. |
| 6,517,000 B1 | 2/2003 | McAllister et al. |
| 6,533,178 B1 | 3/2003 | Gaul et al. |
| 6,600,420 B2 * | 7/2003 | Goff et al. .................. 340/572.4 |
| 6,601,770 B1 | 8/2003 | Ikefuji et al. |
| 6,686,847 B1 | 2/2004 | Mittler |
| 6,769,604 B2 | 8/2004 | Ichikawa et al. |
| 6,883,103 B2 | 4/2005 | Thueringer et al. |
| 7,064,651 B2 | 6/2006 | Goetz |
| 7,075,434 B2 | 7/2006 | Shafir |
| 7,091,412 B2 | 8/2006 | Wang et al. |
| 7,162,302 B2 | 1/2007 | Wang et al. |
| 7,183,929 B1 | 2/2007 | Antebi et al. |
| 7,207,488 B2 | 4/2007 | Hammerslag et al. |
| 7,260,221 B1 | 8/2007 | Atsmon |
| 7,280,970 B2 | 10/2007 | Tamir et al. |
| 7,334,735 B1 | 2/2008 | Antebi et al. |
| 7,383,297 B1 | 6/2008 | Atsmon et al. |
| 2006/0097870 A1* | 5/2006 | Choi et al. .................. 340/572.1 |
| 2006/0187051 A1* | 8/2006 | Wu et al. .................... 340/572.7 |
| 2008/0159364 A1* | 7/2008 | Rofougaran .................. 375/219 |
| 2008/0297421 A1* | 12/2008 | Kriebel et al. ................ 343/702 |
| 2009/0280757 A1* | 11/2009 | Zhu et al. .................... 455/114.1 |

* cited by examiner

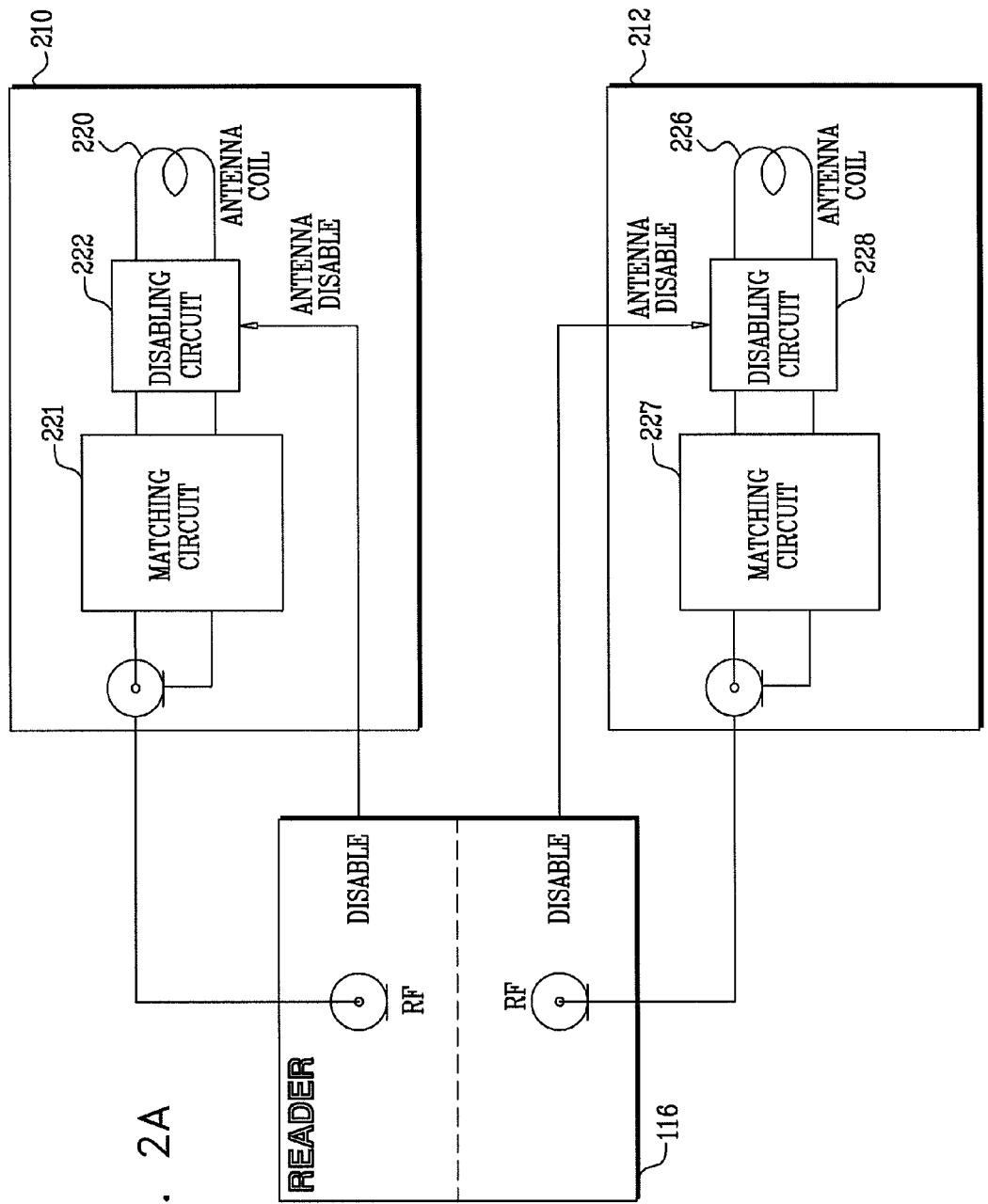

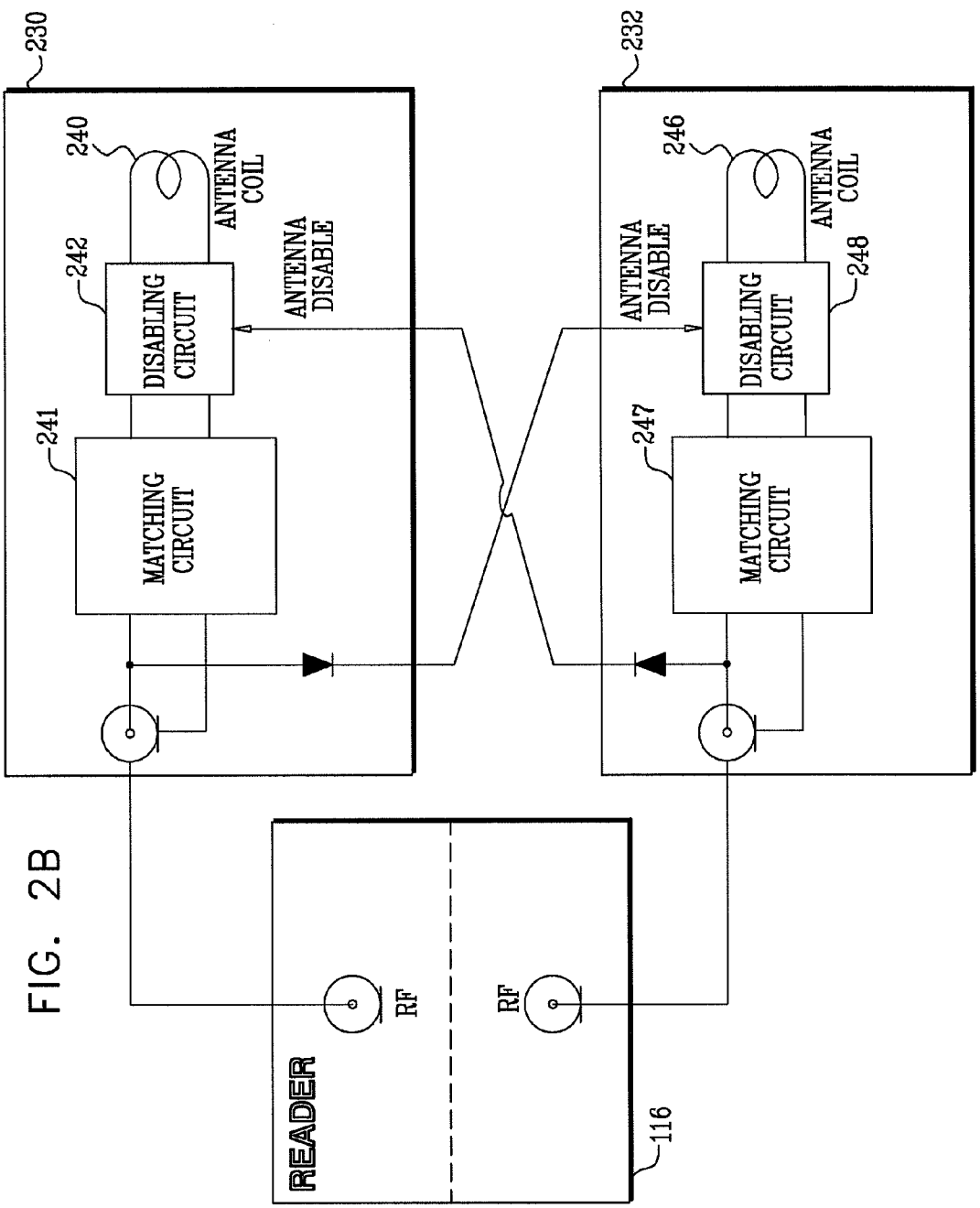

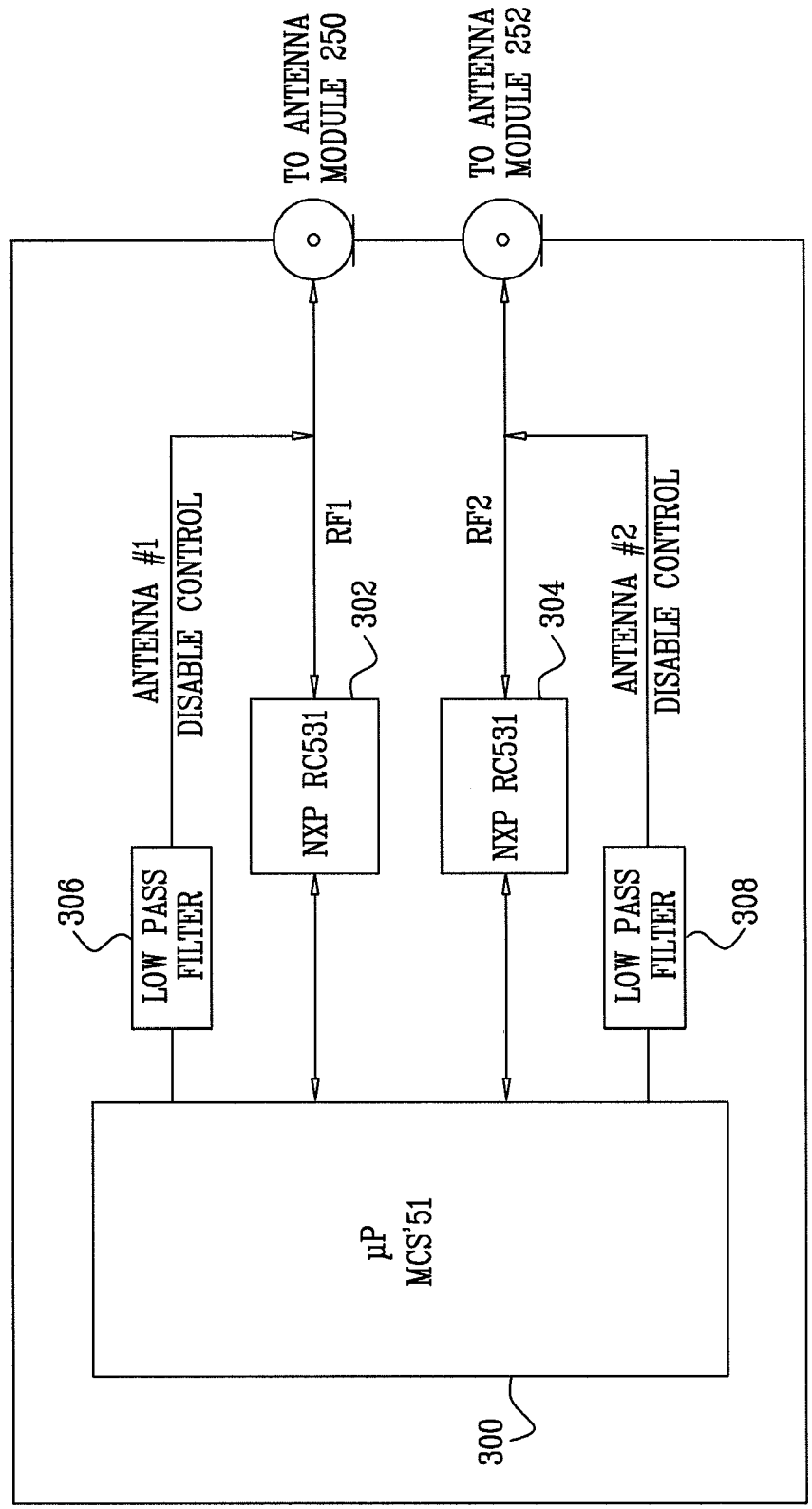

000
MULTIPLE ANTENNA READING SYSTEM SUITABLE FOR USE WITH CONTACTLESS TRANSACTION DEVICES

FIELD OF THE INVENTION

The present invention relates to contactless card reading systems and methodologies.

BACKGROUND OF THE INVENTION

The following patent publications are believed to represent the current state of the art:
U.S. Pat. Nos. 3,395,353; 4,497,068; 4,857,760; 4,951,044; 5,241,160; 5,349,173; 5,357,091; 5,539,188; 5,640,003; 5,698,838; 5,801,372; 5,812,942; 5,815,020; 5,825,329; 5,831,257; 5,864,126; 5,874,725; 5,978,655; 6,021,951; 6,074,312; RE36769; 6,161,762; 6,202,927; 6,209,592; 6,234,902; 6,329,139; 6,375,082; 6,445,743; 6,507,130; 6,517,000; 6,533,178; 6,601,770; 6,686,847; 6,769,604; 6,883,103; 7,064,651; 7,075,434; 7,091,412; 7,162,302; 7,183,929; 7,207,488; 7,260,221; 7,280,970; 7,334,735 and 7,383,297.

SUMMARY OF THE INVENTION

The present invention seeks to provide improved contactless card reading systems and methodologies.

There is thus provided in accordance with a preferred embodiment of the present invention a multiple antenna reading system suitable for use with contactless transaction devices, the system including at least one reader, at least first and second antennas having at least some inductive coupling therebetween and being coupled to the at least one reader and antenna function disabling circuitry automatically operative upon activation of at least a first one of the at least first and second antennas to disable antenna function of at least a second one of the at least first and second antennas.

Preferably, the activation of one of the first and second antennas includes generation of an RF field by the one of the first and second antennas as a result of an RF signal generated by the reader.

In accordance with a preferred embodiment of the present invention, the antenna function disabling circuitry receives a control signal from the at least one reader. Alternatively, the antenna function disabling circuitry receives a control signal from at least one of the at least first and second antennas.

Preferably, the at least one reader also includes at least one of communication, computation and logic functionalities. In accordance with a preferred embodiment of the present invention, each of the at least first and second antennas are arranged to communicate with a smart card.

In accordance with a preferred embodiment of the present invention, the at least first and second antennas are associated with access control functionality. Additionally or alternatively, the at least first and second antennas are associated with identification functionality. Alternatively or additionally, the at least first and second antennas are associated with payment functionality.

Preferably, each of the at least first and second antennas includes an antenna coil and antenna matching circuitry.

In accordance with a preferred embodiment of the present invention, the antenna function disabling circuitry is operative to selectably effectively short circuit the antenna coil. Alternatively, the antenna function disabling circuitry is operative to selectably change a resonant frequency of the antenna coil. Alternatively, the antenna function disabling circuitry is operative to selectably change the Q-factor of the antenna coil. As a further alternative, the antenna function disabling circuitry is operative to selectably prevent generation of an RF field by the antenna coil.

Preferably, the control signal includes a rectified RF signal output. Additionally or alternatively, the control signal is routed from the at least one reader to the at least first and second antenna via a dedicated line. Alternatively, the control signal is routed from the at least one reader superimposed on the RF signal via a single cable to the at least first and second antenna.

In accordance with a preferred embodiment of the present invention, the reader includes at least first and second low pass filters operative to prevent the RF signals from being attenuated.

In accordance with a preferred embodiment of the present invention, each of the at least first and second antennas also includes a low pass filter. Additionally, the low pass filter includes an inductor, a resistor and a capacitor connected in series.

Preferably, the at least one reader includes a microcontroller and at least a first and a second RF transceivers.

In accordance with a preferred embodiment of the present invention, the at least first and second antennas include more than two antennas and antenna function disabling circuitry operates with the more than two antennas such that more than one antenna may be activated simultaneously and more than one antenna may be deactivated simultaneously. Additionally or alternatively, the at least one reader includes multiple readers connected to multiple one of the at least first and second antennas and more than one antenna may be activated simultaneously and more than one antenna may be deactivated simultaneously.

In accordance with a preferred embodiment of the present invention, the at least one reader includes multiple readers, the at least first antenna is coupled to a first reader of the multiple readers and the at least second antenna is coupled to a second reader of the multiple readers. Alternatively, the at least one reader includes one reader and the at least first antenna and the at least second antenna are coupled to the one reader.

BRIEF DESCRIPTION OF THE DRAWINGS

The present invention will be understood and appreciated more fully from the following detailed description, taken in conjunction with the drawings in which:

FIGS. 2A, 2B and 2C are simplified block diagram illustrations of three alternative embodiments of a multiple antenna reading system useful in the embodiments of FIGS. 1A & 1B;

FIGS. 5A, 5B and 5C are simplified illustrations of a reader useful in the embodiments of FIGS. 2A, 2B and 2C respectively.

DETAILED DESCRIPTION OF PREFERRED EMBODIMENTS

Figure 1B:
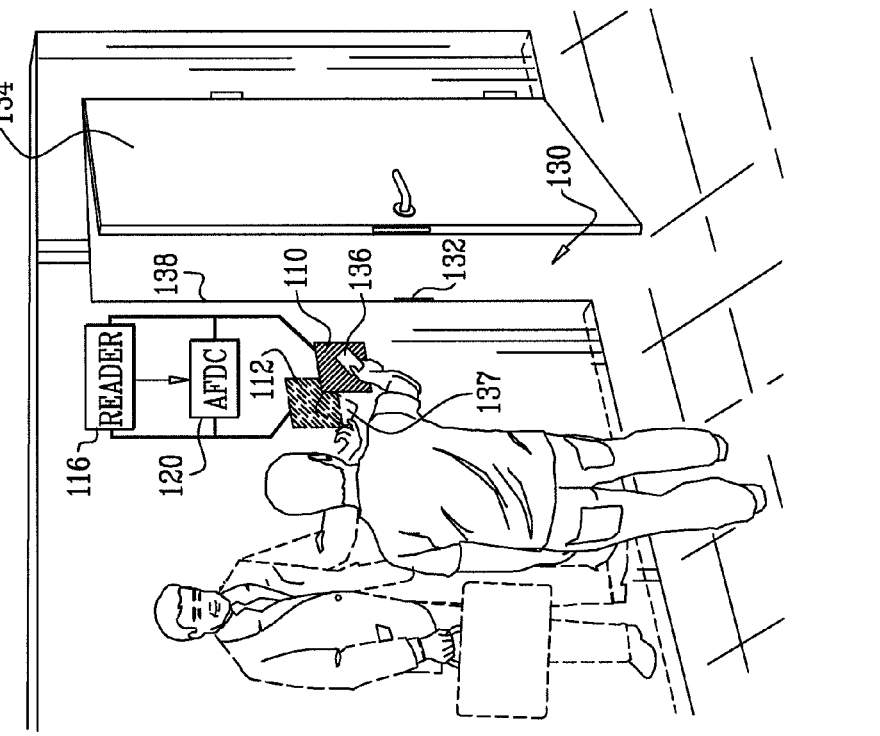
FIG. 1B is a simplified, partially-pictorial, partially block diagram illustration of a contactless card reading system constructed and operative in accordance with a preferred embodiment of the present invention in the context of an access control system.
Figure 1A:
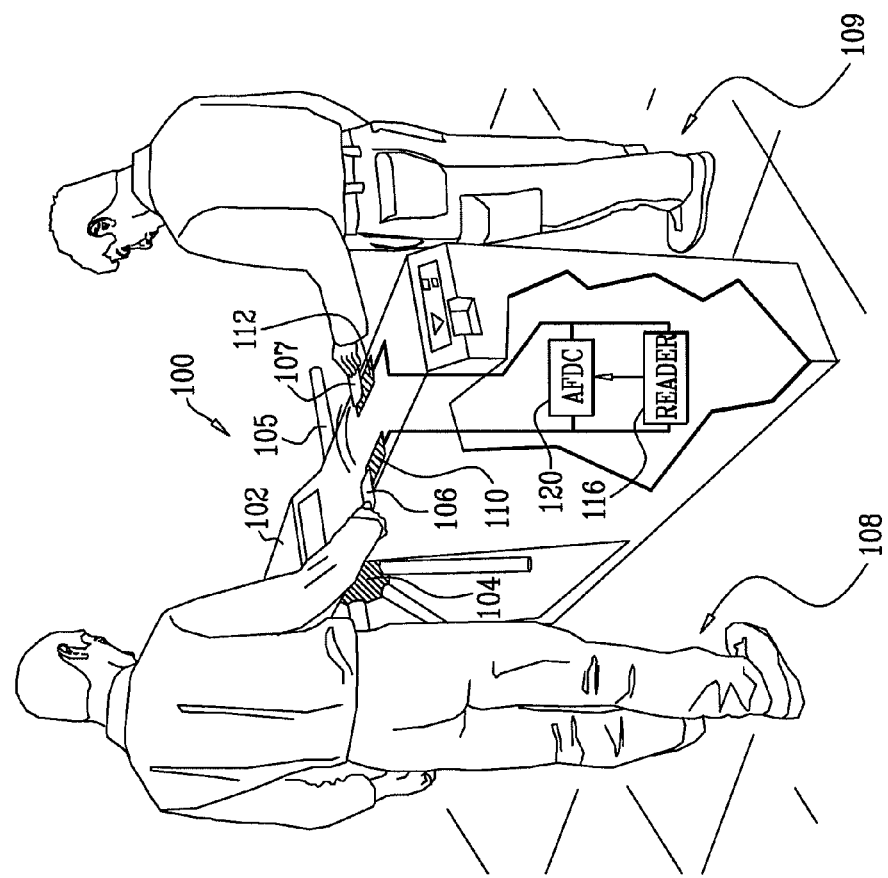
FIG. 1A is a simplified, partially-pictorial, partially block diagram illustration of a contactless card reading system constructed and operative in accordance with a preferred embodiment of the present invention in the context of a transportation system.

Reference is now made to FIG. 1A, which is a simplified, partially-pictorial, partially block diagram illustration of a contactless card reading system constructed and operative in accordance with a preferred embodiment of the present invention in the context of a transportation system.

As seen in FIG. 1A, there is provided a turnstile 100 having a central pillar 102 and a pair of rotatable turnstile turrets 104 and 105 governing passage of persons, each bearing a contactless card, such as prepaid transportation system smart cards 106 and 107, through a pair of passages 108 and 109. The operation of each of turnstile turrets 104 and 105 is governed independently by turnstile control circuitry including a pair of antennas 110 and 112 disposed in propinquity, preferably on a top surface 114 of pillar 102.

Due to a desire to minimize the width of pillar 102, antennas 110 and 112 may be located sufficiently close to one another so as to have at least some inductive coupling therebetween. Antennas 110 and 112 are coupled to one or more reader 116. The term "reader" is used herein in a broad sense and includes a conventional contactless reader as well as optional communication, computation and logic functionalities.

Antenna 110 is arranged to read a smart card 106 of a person passing through passage 108, while antenna 112 is arranged to read a smart card 107 of a person passing through passage 109. It is appreciated that it is unacceptable that smart card 106 placed adjacent antenna 110 be read instead by antenna 112 and thus operate turret 105 instead of turret 104.

It is further appreciated that typically smart cards 106 and 107 may have different values loaded therein, or different payment arrangements in force at any given time and that turnstile control circuitry typically charges different charges on smart cards 106 and 107, depending, for example, on the distance travelled or the payment arrangement currently in force.

It is a particular feature of the present invention that there is provided antenna function disabling circuitry 120, which is automatically operative upon activation of at least a first one of the antennas 110 and 112 to disable antenna function of a second one of the antennas 110 and 112, thereby to prevent inadvertent reading of a contactless card 106 at antenna 112.

Antenna function disabling circuitry 120 typically includes circuitry associated with each of antennas 110 and 112 as well as circuitry associated with reader 116. Alternatively, antenna function disabling circuitry 120 need not be associated with reader 116.

Antennas 110 and 112, reader 116 and antenna function disabling circuitry 120 are together referred to as a multiple antenna reading system.

Reference is now made to FIG. 1B, which is a simplified, partially-pictorial, partially block diagram illustration of a contactless card reading system constructed and operative in accordance with a preferred embodiment of the present invention in the context of an access control system. For the sake of convenience and clarity, items in the embodiment of FIG. 1B which may be identical to those described above in the embodiment of FIG. 1A are given identical reference numbers.

As seen in FIG. 1B, there is provided a bi-directional access control terminal assembly 130 associated with a door lock 132 of a door 134. The bi-directional access control terminal assembly 130 governs passage of persons, each bearing a contactless card, such as access control cards 136 and 137, through door 134. The operation of door lock 132 is governed by access control circuitry forming part of assembly 130 and including a pair of antennas 110 and 112 disposed in propinquity, preferably on opposite sides of a wall 138 adjacent door 134.

In practice, antennas 110 and 112 may be located sufficiently close to one another so as to have at least some inductive coupling therebetween. Antennas 110 and 112 are coupled to one or more reader 116. The term "reader" is used herein in a broad sense and includes a conventional contactless reader as well as optional communication, computation and logic functionalities.

Antenna 110 is arranged to read a smart card 136 of a person passing through door 134 in a first direction, while antenna 112 is arranged to read a smart card 137 of a person passing through door 134 in a direction opposite to the first direction. It is appreciated that it is unacceptable that smart card 136 placed adjacent antenna 110 be read instead by antenna 112 and thus register access in an incorrect direction.

It is further appreciated that typically smart cards 136 and 137 may have different access entitlements loaded therein, for example, the holder of card 136 may be entitled to pass through door 134 in one direction but not in the other.

As in the embodiment of FIG. 1A, it is a particular feature of the present invention that there is provided antenna function disabling circuitry 120, which is automatically operative upon activation of at least a first one of the antennas 110 and 112 to disable antenna function of a second one of the antennas 110 and 112, thereby to prevent inadvertent reading of a contactless card 106 at antenna 112.

Antenna function disabling circuitry 120 typically includes circuitry associated with each of antennas 110 and 112 as well as circuitry associated with reader 116. Alternatively, antenna function disabling circuitry 120 need not be associated with reader 116. Various examples of antenna function disabling circuitry 120 will now be described with reference to FIGS. 2A-2C.

Antennas 110 and 112, reader 116 and antenna function disabling circuitry 120 are together referred to as a multiple antenna reading system.

Figure 2C:
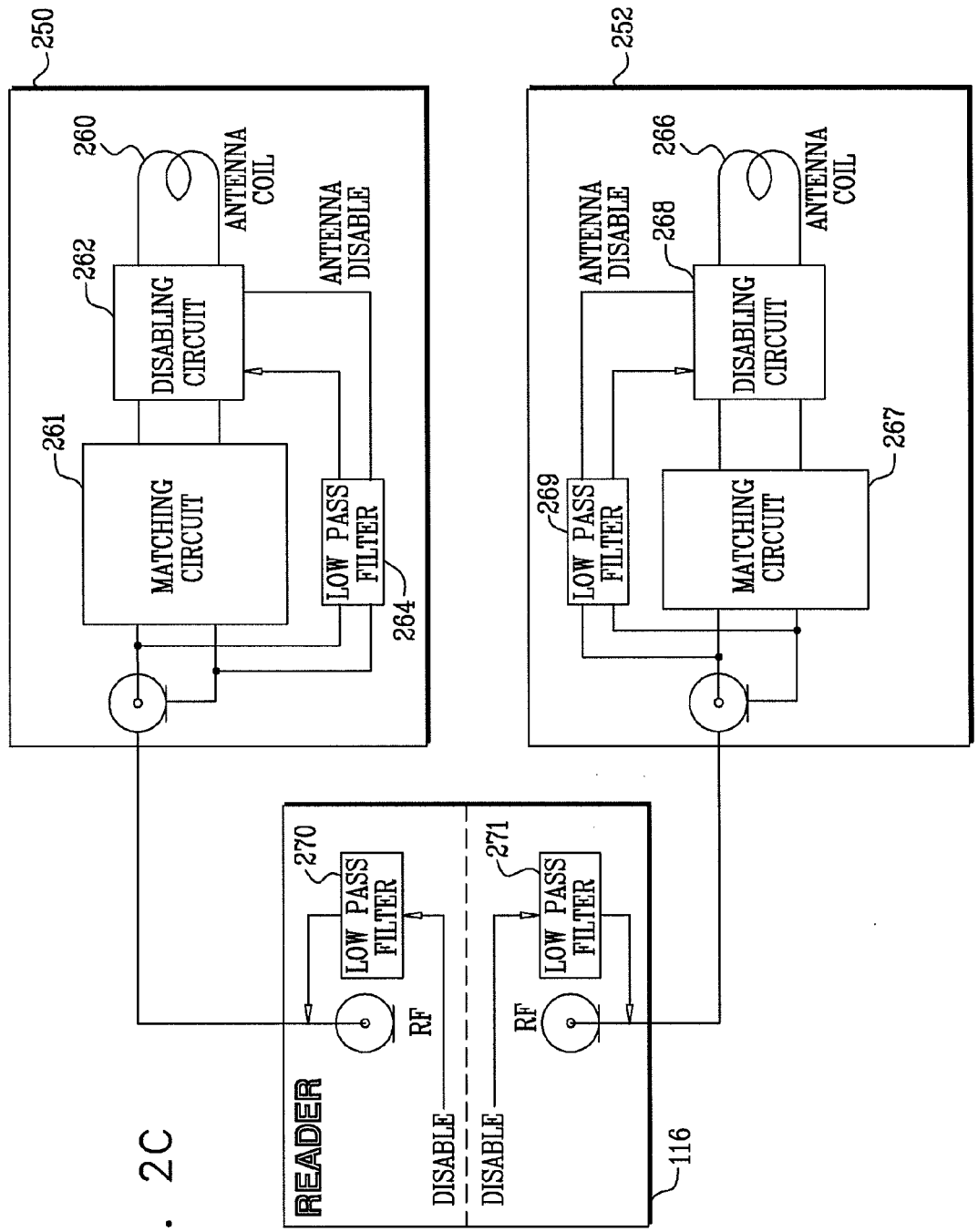

Reference is now made to FIGS. 2A, 2B and 2C are simplified block diagram illustrations of three alternative embodiments of the multiple antenna reading system of FIGS. 1A & 1B.

Figure 5A:
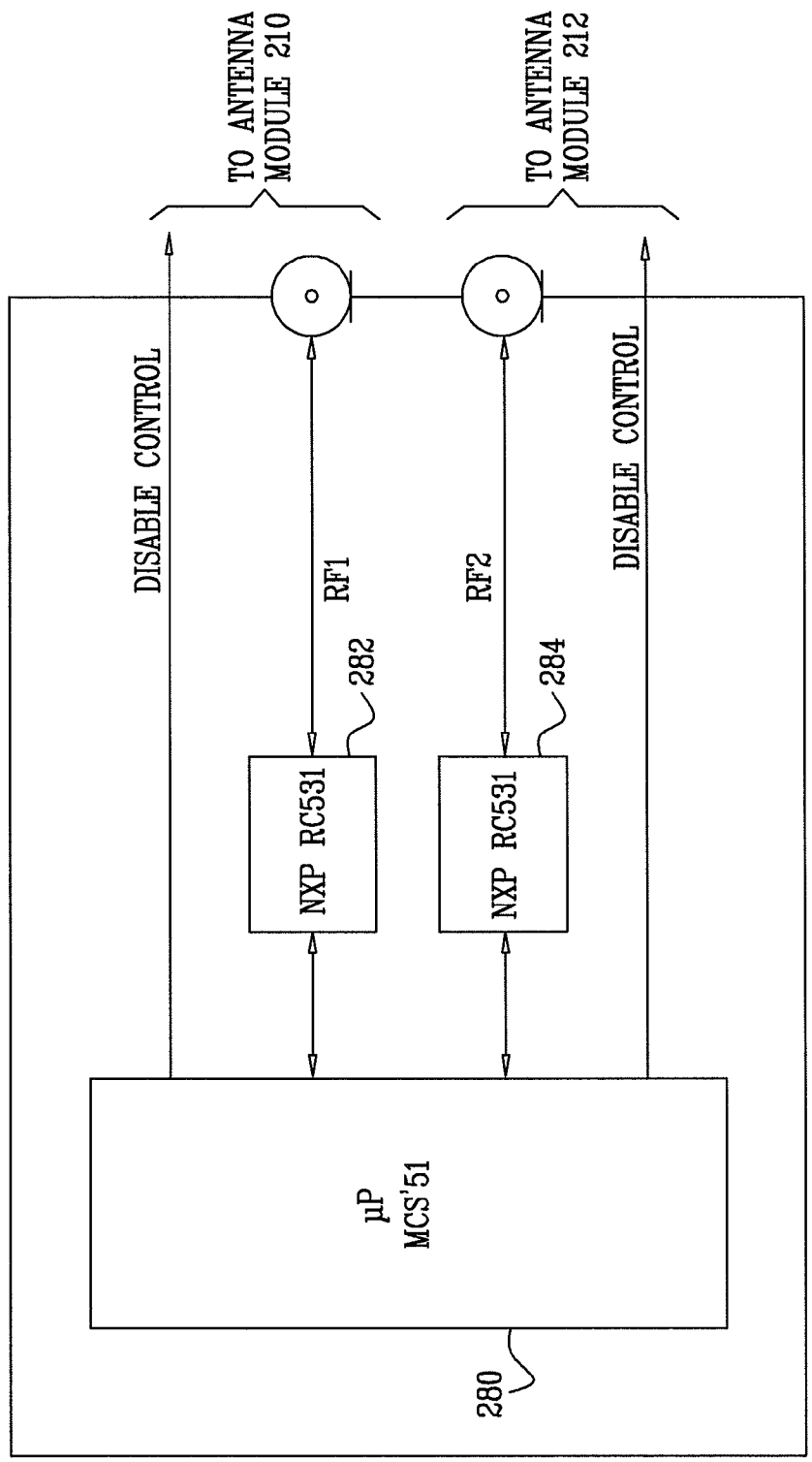

In the embodiment of FIG. 2A, reader 116 is preferably as shown in FIG. 5A as described hereinbelow. A pair of antenna modules 210 and 212 are coupled to reader 116, preferably by coaxial galvanic connections. Antenna module 210 includes an antenna coil 220, corresponding to either of antennas 110 and 112, which is coupled to reader 116 via antenna matching circuitry 221 and via a disabling circuit 222, which selectably effectively short circuits antenna coil 220 or otherwise changes its resonance frequency or Q factor. Alternatively, disabling circuit 222 may otherwise prevent generation of an RF field by the antenna.

Antenna module 212 includes an antenna coil 226, corresponding to the other of antennas 110 and 112, which is coupled to reader 116 via antenna matching circuitry 227 and via a disabling circuit 228, which selectably effectively short circuits antenna coil 220 or otherwise changes its resonance frequency or Q factor. Alternatively, disabling circuit 222 may otherwise prevent generation of an RF field by the antenna.

Antenna matching circuitry 221/227 is preferably of the type described in applicant/assignee's U.S. Pat. No. 5,241, 160, the disclosure of which is hereby incorporated by reference.

It is a particular feature of the present invention that reader 116 is operative to provide a disable signal to disable circuit 228 during activation of antenna coil 220 and is operative to provide a disable signal to disable circuit 222 during activation of antenna coil 226. The disable signal provided to disable circuit 228 is operative to short circuit antenna coil 226 and the disable signal provided to disable circuit 222 is operative to short circuit antenna coil 220.

Figure 5B:
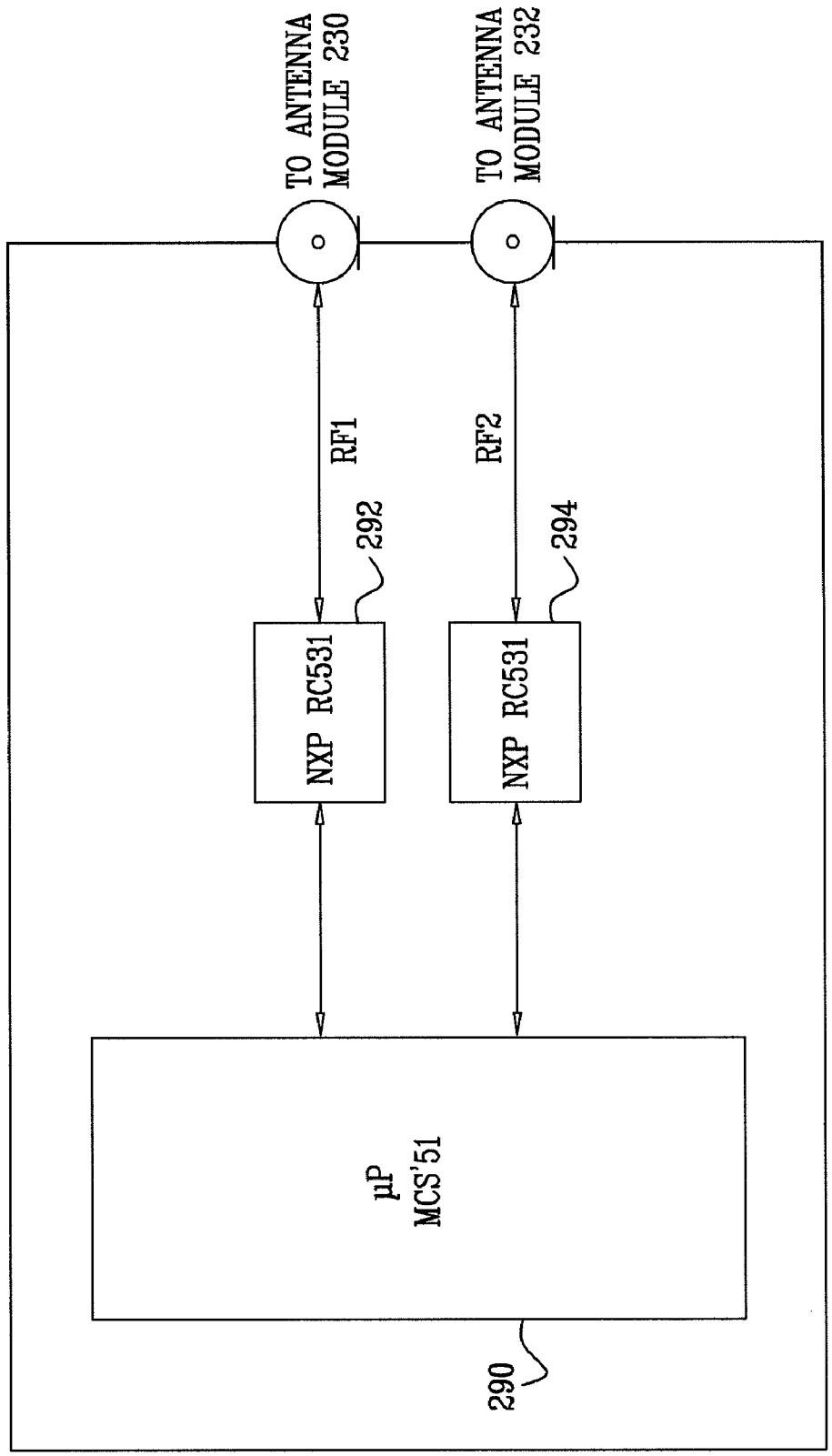

In the embodiment of FIG. 2B, reader 116 is preferably as shown in FIG. 5B as described hereinbelow. A pair of antenna modules 230 and 232 are coupled to reader 116, preferably by coaxial galvanic connections. Antenna module 230 includes an antenna coil 240, corresponding to either of antennas 110 and 112, which is coupled to reader 116 via antenna matching circuitry 241 and via a disable circuit 242, which selectably effectively short circuits antenna coil 240. Antenna module 232 includes an antenna coil 246, corresponding to the other of antennas 110 and 112, which is coupled to reader 116 via antenna matching circuitry 247 and via a disable circuit 248, which selectably effectively short circuits antenna coil 246.

Antenna matching circuitry 241/247 is preferably of the type described in applicant/assignee's U.S. Pat. No. 5,241, 160, the disclosure of which is hereby incorporated by reference.

It is a particular feature of the present invention that an RF signal output by reader 116 via the coaxial galvanic connection with antenna module 230 is rectified and employed to provide a disable signal to disable circuit 248 during activation of antenna coil 240 and an RF signal output by reader 116 via the coaxial galvanic connection with antenna module 232 is rectified and employed to provide a disable signal to disable circuit 242 during activation of antenna coil 246. The disable signal provided to disable circuit 248 is operative to short circuit antenna coil 246 and the disable signal provided to disable circuit 242 is operative to short circuit antenna coil 240.

In the embodiment of FIG. 2C, reader 116 is preferably as shown in FIG. 5C as described hereinbelow. A pair of antenna modules 250 and 252 are coupled to reader 116, preferably by coaxial galvanic connections. Antenna module 250 includes an antenna coil 260, corresponding to either of antennas 110 and 112, which is coupled to reader 116 via antenna matching circuitry 261 and via a disabling circuit 262, which selectably effectively short circuits antenna coil 260 in response to a disable signal received via a low pass filter 264.

Antenna module 252 includes an antenna coil 266, corresponding to the other of antennas 110 and 112, which is coupled to reader 116 via antenna matching circuitry 267 and via a disabling circuit 268, which selectably effectively short circuits antenna coil 266 in response to a disable signal received via a low pass filter 269.

Antenna matching circuitry 261/267 is preferably of the type described in applicant/assignee's U.S. Pat. No. 5,241, 160, the disclosure of which is hereby incorporated by reference.

It is a particular feature of this embodiment of the present invention that the reader 116 provides superimposed RF and DC control signals along the coaxial galvanic connections with the antenna modules 250 and 252. The reader 116 includes a pair of low pass filters 270 and 271 which prevent the RF signals from being attenuated.

Figure 3:
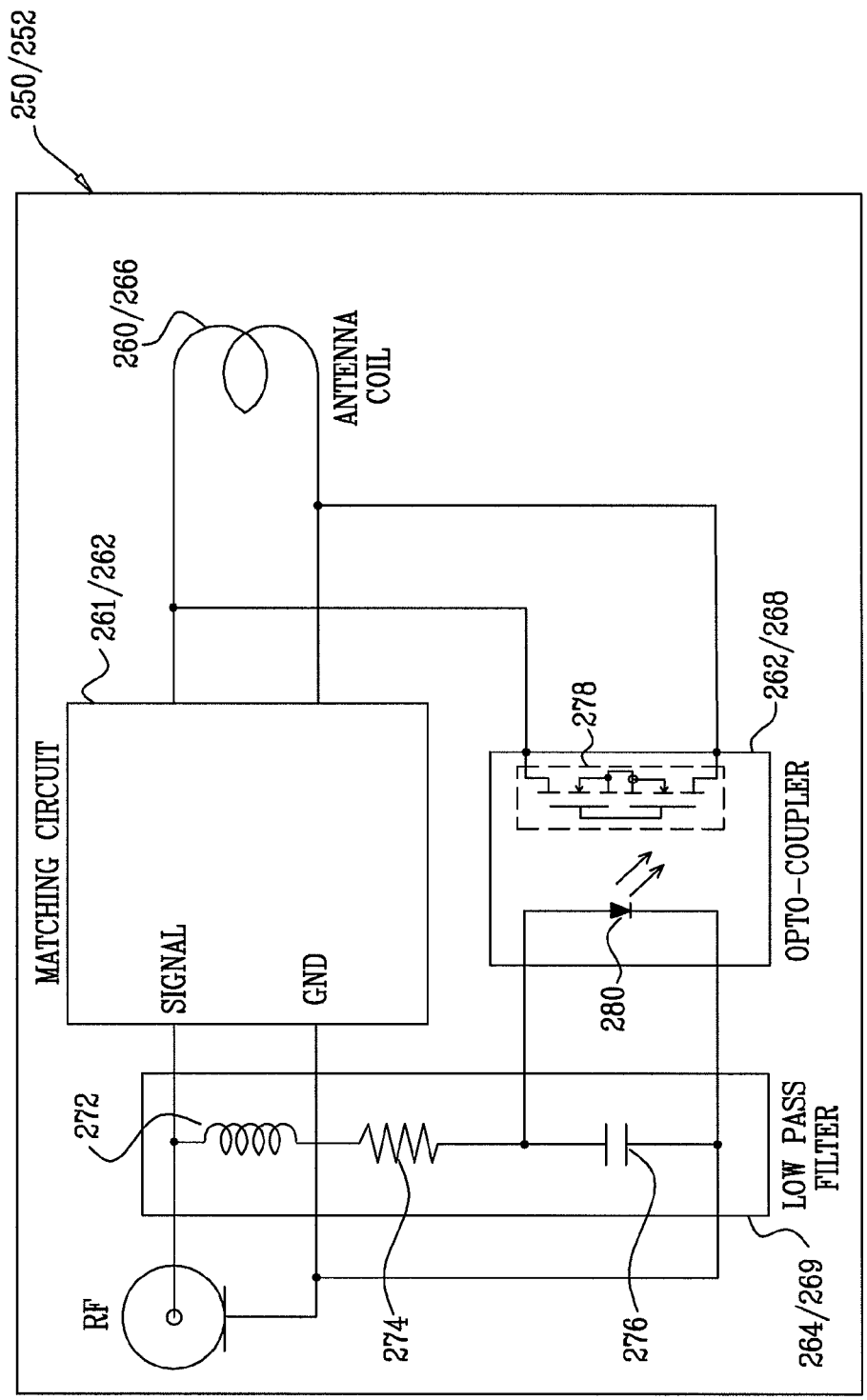
FIG. 3 is a simplified circuit diagram of an antenna module in the embodiment of FIG. 2C.

It is a particular feature of this embodiment of the present invention that reader 116 is operative to provide a disable signal to disable circuit 268 during activation of antenna coil 260 and is operative to provide a disable signal to disable circuit 262 during activation of antenna coil 266. The disable signal provided to disable circuit 268 is operative to short circuit antenna coil 266 and the disable signal provided to disable circuit 262 is operative to short circuit antenna coil 260. In the embodiment of FIG. 2C, the DC control signals from the reader 116 are routed via the coaxial galvanic connections and low pass filters 264/269. Reference is now made to FIG. 3 which illustrates each of antenna modules 250 and 252 in the embodiment of FIG. 2C. As seen in FIG. 3, low pass filter 264/269, comprising an inductor 272, a resistor 274 and a capacitor 276 connected in series, is coupled between the signal input to the matching circuit 261/267 and ground. An output of the low pass filter 264/269, preferably at the junction of resistor 274 and capacitor 276, serves as a disable signal supplied to disable circuit 262/268, which is preferably an optocoupler 278. Resistor 274 controls the input current needed for activation of diode 280 of optocoupler 278.

Figure 4:
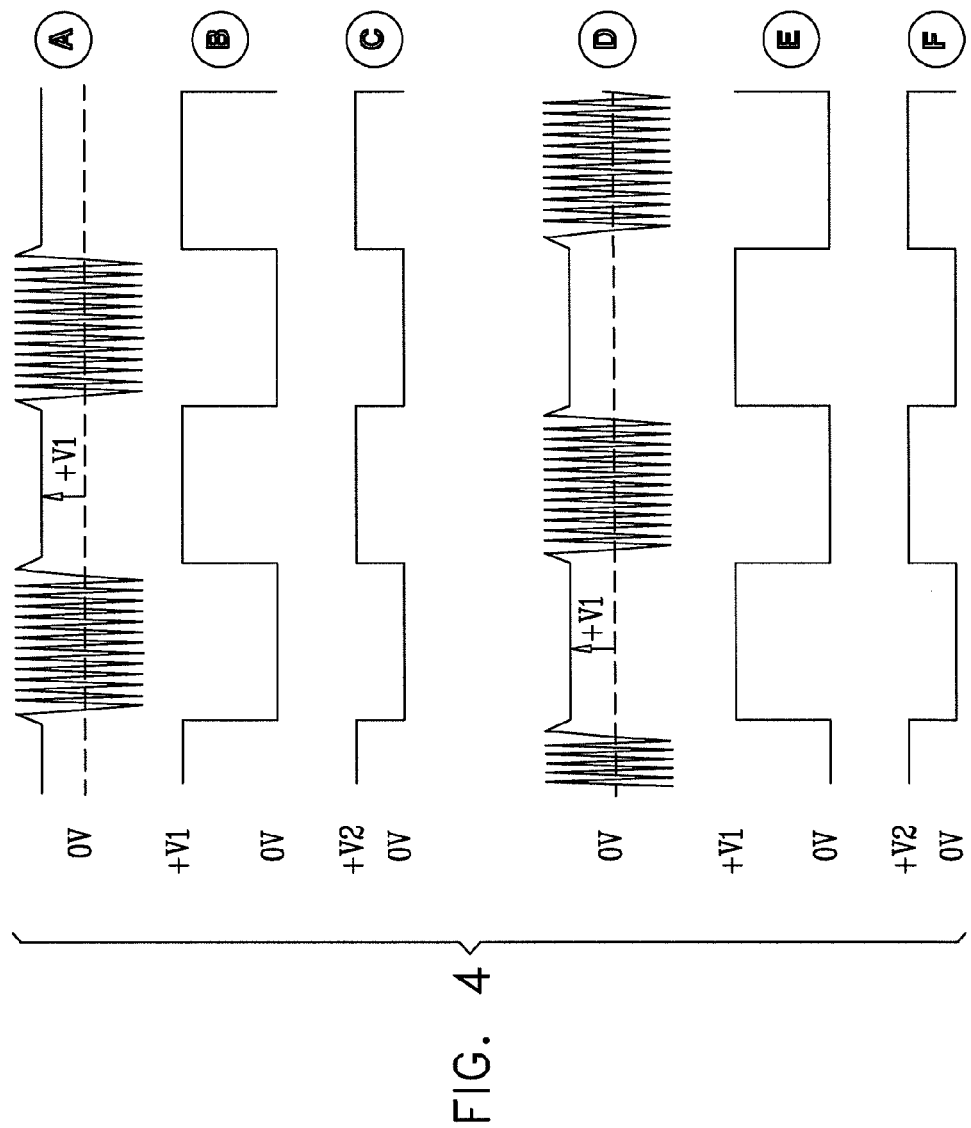
FIG. 4 is a simplified signal diagram corresponding to the operation of the embodiment of FIG. 3.

Reference is now made to FIG. 4, which illustrates the operation of the circuitry of FIGS. 2C and 3. With particular reference to the preferred embodiment shown in FIG. 2C, in FIG. 4, trace A illustrates the signal carried by the coaxial galvanic connection in antenna module 250, trace B illustrates a DC control signal provided by reader 116 which is superimposed on the RF output of reader 116 to form the signal in trace A. Trace C illustrates a DC signal output by the low pass filter 264 of antenna module 250. It is appreciated that the voltage of the DC signal in trace C is governed by resistor 274 in order to be suitable for diode 280 of optocoupler 278. Trace D illustrates the signal carried by the coaxial galvanic connection in antenna module 252. Trace E illustrates the second DC control signal provided by reader 116 which is superimposed on the RF output of reader 116 to form the signal in trace D. Trace F illustrates a DC signal output by the low pass filter 269 of antenna module 252.

As seen in FIG. 3 and at FIG. 4 in traces A and C, when antenna coil 260 of antenna module 250 is operating, an RF signal is carried by the coaxial galvanic connection. Low pass filter 264 blocks this RF signal with the result that a disable signal is not provided to switch 262 and when antenna coil 260 of antenna module 250 is not operating, a DC control signal from reader 116 is routed via the coaxial galvanic connection, passes through low pass filter 264 and is provided as a disable signal to switch 262.

As further seen in FIG. 3 and at FIG. 4 in traces D and F, when antenna coil 266 of antenna module 252 is operating, an RF signal is carried by the coaxial galvanic connection. Low pass filter 269 blocks this RF signal with the result that a disable signal is not provided to switch 268 and when antenna coil 266 of antenna module 252 is not operating, a DC control signal from reader 116 is routed via the coaxial galvanic connection, passes through low pass filter 269 and is provided as a disable signal to switch 268.

Reference is now made to FIGS. 5A, 5B and 5C, which are simplified illustrations of a reader useful in the embodiments of FIGS. 2A, 2B and 2C, respectively. In the embodiment of FIG. 5A, a microcontroller 280, such as an MCS'51, interfaces with first and second RF transceivers 282 and 284, which are typically NXP RC531 chips, whose outputs are supplied to the antenna modules 210 and 212 respectively. Microcontroller 280 provides disable control signals to respective disabling circuits 222 and 228.

In the embodiment of FIG. 5B, a microcontroller 290, such as an MCS'51, interfaces with first and second RF transceivers 292 and 294, which are typically NXP RC531 chips, whose outputs appear as the RF portions of traces A and D respectively in FIG. 4.

In the embodiment of FIG. 5C, a microcontroller 300, such as an MCS'51, interfaces with first and second RF transceivers 302 and 304, which are typically NXP RC531 chips, whose outputs appear as the RF portions of traces A and D respectively in FIG. 4. Microcontroller 300 preferably provides two disable control signals which are routed via the coaxial galvanic connection to respective antenna modules 250 and 252, which appear as the DC portions of traces A and D respectively in FIG. 4. Low pass filters 306 and 308 are provided to prevent the RF signals from being attenuated.

Figure 6:
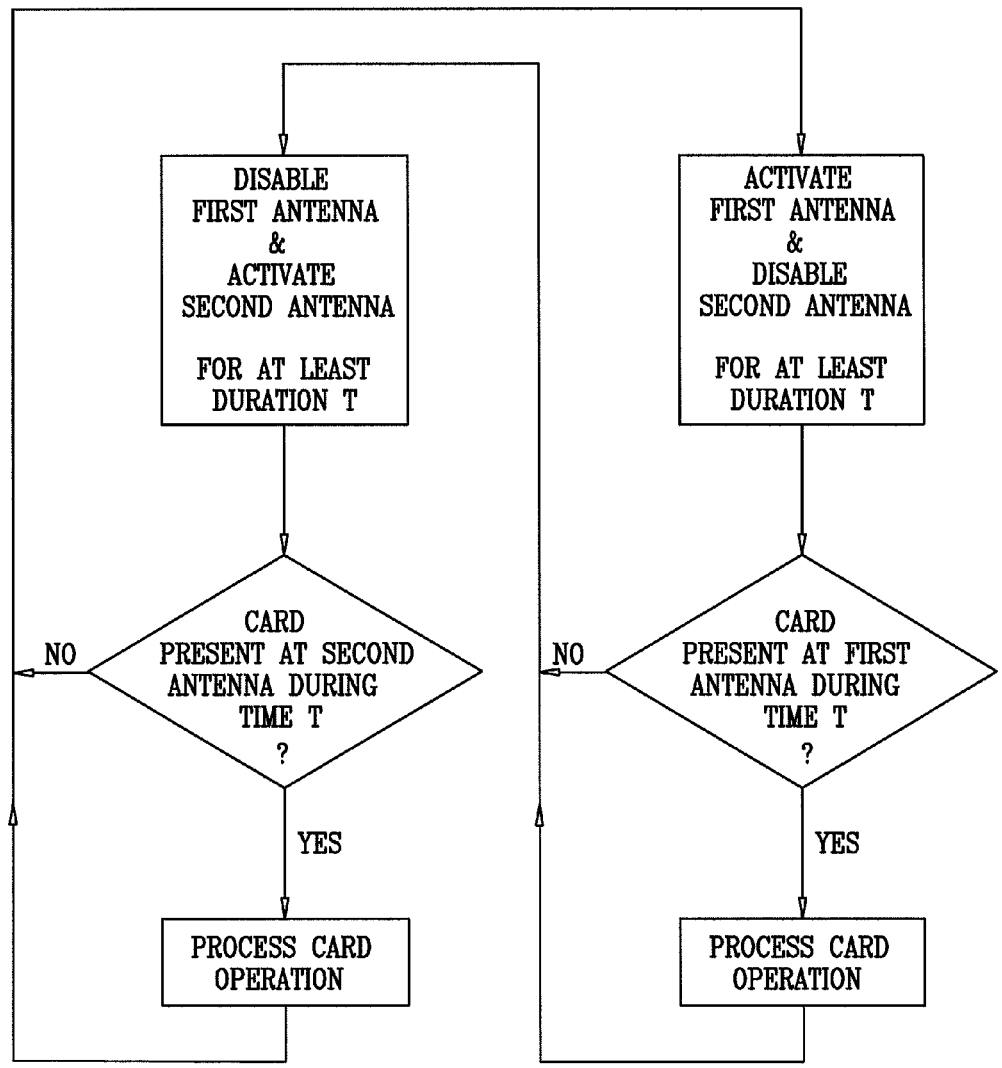
FIG. 6 is a simplified flowchart illustrating some features of the operation of the embodiments of any of FIGS. 2A-2C.

Reference is now made to FIG. 6, which is a simplified flowchart illustrating operation of an embodiment of the present invention employing the circuitry of any of FIGS. 2A-2C.

As seen in FIG. 6, the reader 116 preferably activates a first antenna, which may be either of antennas 110 and 112 and generally simultaneously deactivates a second antenna, which is the other of antennas 110 and 112. The activation of the first antenna and corresponding deactivation of the second antenna is for a duration of at least a time T. Activation of the first antenna produces an RF field in the general region thereof and sends a smart card interrogation message superimposed on the RF field. For example, this type of antenna functionality may be in accordance with the ISO/IEC 14443 Standard or the ISO/IEC 15693 Standard.

If a smart card such as one of cards 106, 107, 136 and 137, responds to the interrogation message from the first antenna within the time duration T, bidirectional communication is established between the reader 116 and the card, which may continue beyond time duration T. Upon termination of that communication, typically irrespective of the whether the card is removed from the RF field of the first antenna, the reader 116 deactivates the first antenna and generally simultaneously activates the second antenna.

However, if a smart card such as one of cards 106, 107, 136 and 137, does not respond to the interrogation message from the first antenna within the time duration T, the reader 116 deactivates the first antenna and generally simultaneously activates the second antenna for a time duration T. Activation of the second antenna produces an RF field in the general region thereof and sends a smart card interrogation message superimposed on the RF field.

If a smart card such as one of cards 106, 107, 136 and 137, responds to the interrogation message from the second antenna within the time duration T, bidirectional communication is established between the reader 116 and the card, which may continue beyond time duration T. Upon termination of that communication, typically irrespective of the whether the card is removed from the RF field of the second antenna, the reader 116 deactivates the second antenna and generally simultaneously activates the first antenna.

However, if a smart card such as one of cards 106, 107, 136 and 137, does not respond to the interrogation message from the second antenna within the time duration T, the reader 116 deactivates the second antenna and generally simultaneously activates the first antenna for a time duration T.

It is appreciated that the time durations T need not all be the same.

It is further appreciated that the system of the present invention can operate with more than two antennas and that the functionality described hereinabove is readily adapted for multiple antenna operation. In such a case, more than one antenna may be activated simultaneously and more than one antenna may be deactivated simultaneously.

It will be appreciated by persons skilled in the art that the present invention is not limited by what has been particularly shown and described hereinabove. Rather the scope of the present invention includes both combinations and subcombinations of various features described hereinabove and variations and modifications thereof which are not shown in the prior art.

The invention claimed is:

1. A multiple antenna reading system suitable for use with contactless transaction devices, said system comprising:
at least one reader;
at least first and second antennas having at least some inductive coupling therebetween and being coupled to said at least one reader; and
antenna function disabling circuitry automatically operative, in response to receiving a control signal from said at least one reader upon activation of at least a first one of said at least first and second antennas, to disable antenna function of at least a second one of said at least first and second antennas by at least one of short circuiting said second one of said at least first and second antennas, changing the resonant frequency of said second one of said at least first and second antennas and changing the Q factor of said second one of said at least first and second antennas, said control signal being at least one of a rectified RF signal output and a signal routed from said at least one reader superimposed on an RF signal via a single cable to said at least first and second antennas.

2. A multiple antenna reading system according to claim 1 and wherein said activation of one of said first and second antennas comprises generation of an RF field by said one of said first and second antennas as a result of an RF signal generated by said reader.

3. A multiple antenna reading system according to claim 1 and wherein said at least one reader also comprises at least one of communication, computation and logic functionalities.

4. A multiple antenna reading system according to claim 1 and wherein each of said at least first and second antennas are arranged to communicate with a smart card.

5. A multiple antenna reading system according to claim 1 and wherein said at least first and second antennas are associated with access control functionality.

6. A multiple antenna reading system according to claim 1 and wherein said at least first and second antennas are associated with identification functionality.

7. A multiple antenna reading system according to claim 1 and wherein said at least first and second antennas are associated with payment functionality.

8. A multiple antenna reading system according to claim 1 and wherein each of said at least first and second antennas comprises an antenna coil and antenna matching circuitry.

9. A multiple antenna reading system according to claim 8 and wherein said antenna function disabling circuitry is operative to selectably effectively short circuit said antenna coil.

10. A multiple antenna reading system according to claim 8 and wherein said antenna function disabling circuitry is operative to selectably change a resonant frequency of said antenna coil.

11. A multiple antenna reading system according to claim 8 and wherein said antenna function disabling circuitry is operative to selectably change the Q-factor of said antenna coil.

12. A multiple antenna reading system according to claim 8 and wherein said antenna function disabling circuitry is operative to selectably prevent generation of an RF field by said antenna coil.

13. A multiple antenna reading system according to claim 1 and wherein said control signal comprises a rectified RF signal output.

14. A multiple antenna reading system according to claim 1 and wherein said control signal is routed from said at least one reader to said at least first and second antenna via a dedicated line.

15. A multiple antenna reading system according to claim 1 and wherein said control signal is routed from said at least one reader superimposed on said RF signal via a single cable to said at least first and second antenna.

16. A multiple antenna reading system according to claim 15 and wherein said reader comprises at least first and second low pass filters operative to prevent said RF signals from being attenuated.

17. A multiple antenna reading system according to claim 15 and wherein each of said at least first and second antennas also comprises a low pass filter.

18. A multiple antenna reading system according to claim 17 and wherein said low pass filter comprises an inductor, a resistor and a capacitor connected in series.

19. A multiple antenna reading system according to claim 1 and wherein said at least one reader comprises a microcontroller and at least a first and a second RF transceivers.

20. A multiple antenna reading system according to claim 1 and wherein said at least first and second antennas comprise more than two antennas and antenna function disabling circuitry operates with said more than two antennas such that more than one antenna may be activated simultaneously and more than one antenna may be deactivated simultaneously.

21. A multiple antenna reading system according to claim 1 and wherein said at least one reader comprises multiple readers connected to multiple ones of said at least first and second antennas and more than one antenna may be activated simultaneously and more than one antenna may be deactivated simultaneously.

22. A multiple antenna reading system according to claim 1 and wherein:
   said at least one reader comprises multiple readers;
   said at least first antenna is coupled to a first reader of said multiple readers; and
   said at least second antenna is coupled to a second reader of said multiple readers.

23. A multiple antenna reading system according to claim 1 and wherein:
   said at least one reader comprises one reader; and
   said at least first antenna and said at least second antenna are coupled to said one reader.

* * * * *